Feb. 25, 1930.                J. C. MARTINS                1,748,452
                    PROCESS FOR MANUFACTURING BELT PULLEYS
                              Filed March 9, 1928
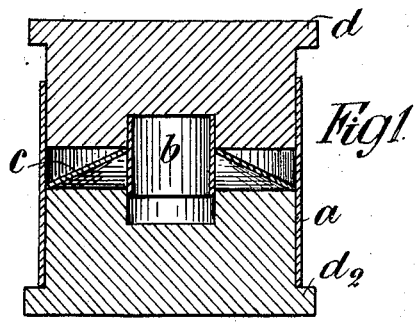
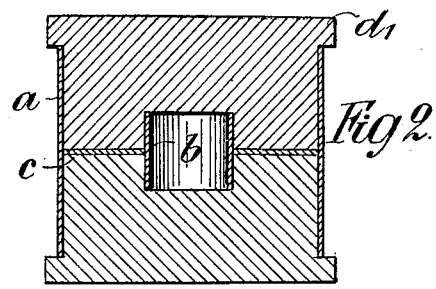
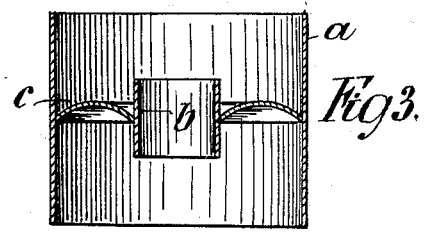
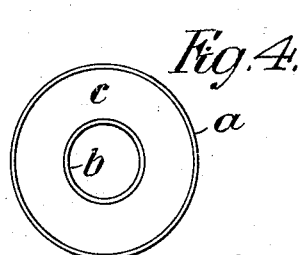
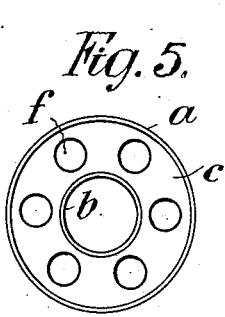
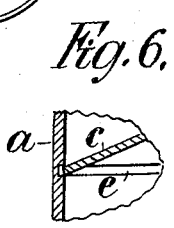
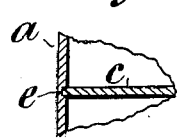
J. C. Martins
INVENTOR Patented Feb. 25, 1930

1,748,452

UNITED STATES PATENT OFFICE

JENS CHRISTIAN MARTINS, OF COPENHAGEN, DENMARK

PROCESS FOR MANUFACTURING BELT PULLEYS

Application filed March 9, 1928, Serial No. 260,453, and in Germany July 27, 1927.

The invention relates to a process for manufacturing belt-pulleys and the like, especially light steel pulleys in serial production. The process is mainly characterized by the feature that a separately manufactured rim and a separately manufactured hub are connected, by pressure, to one separately produced spoke-disc the inside diameter of which is smaller than the outer diameter of the hub, and the outside diameter of which is larger than the inside diameter of the rim, the said spoke-disc being, before the compression, pressed out of its plane shape, in order to enable the parts to be placed loosely inside of each other.

Several constructions of the pulley according to the invention are illustrated on the drawing.

Figs. 1 and 2 show diagrammatically, in section, how a pulley with one single spoke-disc is produced, and also the press-dies belonging thereto.

Fig. 3 a similar pulley before the compression.

Figs. 4 and 5 show two constructions of pulleys, in front elevation, and

Figs. 6 and 7 a detail, before and after the compression.

According to the present invention the pulley consists of a rim $a$ and a hub $b$ which are held together by means of a spoke-disc $c$. The spoke-disc $c$ according to the invention is larger than the radial distance between hub and rim, so that it is not possible to insert the hub right away into the disc $c$ and the latter into the rim $a$. In order that the parts may be placed in position inside of one another the spoke-discs must therefore first be pressed out of shape in the manner indicated by way of example in Figs. 1 and 3. After this deformation it will be possible to place the parts into the relative positions shown on the figures.

By means of suitable press-dies $d'$ and $d^2$ the spoke-discs are subsequently pressed into their final shape and position, whereby they exert so high a pressure against the rim as well as the hub that these parts become firmly interconnected.

It may be of advantage to turn grooves $e$ in the hub as well as the rim, as indicated in Figs. 6 and 7, in order to give the spoke-disc $c$ a firm grip.

In order to attain a smaller weight there may be provided holes $f$ in the disc, as shown in Fig. 5, especially in larger pulleys.

The process is especially suitable for the manufacture of small pulleys in serial production. The rim and the hub may then be produced in shape of pieces of suitable length cut from seamless or welded pipes.

One may evidently proceed in other manners than here shown without transgressing the frames of the present invention. It will thus especially be practicable to produce the spoke-disc with other than round, for instance polygonal hole and outline.

Further, a ball-bearing may in many manners be pressed into position instead of a hub.

What I claim as new is:

Process for the manufacture of belt-pulleys, consisting in the feature that a separately manufactured rim and a separately manufactured hub are interconnected by pressing, by means of a disc-shaped plane connecting member which before the compression is so dimensioned that it cannot be introduced into the member for which reason the member has to be embossed out of plane to enable the assembling to be effected, whereafter the member is straightened again by the compression, substantially as described.

In testimony whereof I affix my signature.

JENS CHRISTIAN MARTINS.